Patented Aug. 30, 1949

2,480,533

UNITED STATES PATENT OFFICE 2,480,533

HYDROXY, HALOGEN SUBSTITUTED DINAPHTHYLMETHANES

Philip S. Winnek, Indianapolis, Ind., assignor to Allied Laboratories, Inc., Kansas City, Mo., a corporation of Delaware No Drawing. Application December 22, 1945, Serial No. 637,120

2 Claims. (Cl. 260—619)

The present invention relates to the preparation of a new class of chemical compounds, namely, hydroxy, halogen substituted dinaphthylmethanes. More particularly, the present invention relates to the preparation of the compounds in the class comprising bis(2-hydroxy halonaphthyl-1) methanes. My new compounds may be represented by the following formula:

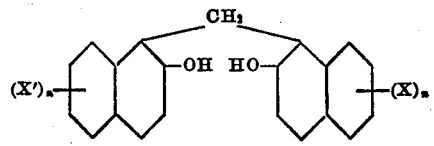

wherein X and X' represent members of the group consisting of chlorine and bromine atoms and $n$ is a small whole number not greater than 4.

The compounds produced in accordance with the present invention have a bactericidal and fungicidal action. In addition, they show promise as anthelmintic drugs. The toxicity of these compounds in experimental animals has been found to be very much less than that of beta naphthol. This surprising and unexpected decrease in toxicity improves the therapeutic ratio of my compounds.

While the present invention is not limited to any particular method for the production of my compounds, I have found that they can be very readily obtained by the chlorination or bromination of bis(2-hydroxy naphthyl-1) methane. The following examples will serve to illustrate a method for the production of my chlorinated compounds:

Preparation of bis(2-hydroxy-x,x'-dichloro naphthyl-1) methane. 10 gm. (0.033 mol) of bis(2-hydroxy naphthyl-1) methane was suspended in 75 cc. of glacial acetic acid and stirred mechanically. A fairly rapid stream of chlorine gas was bubbled in the stirred mixture and it warmed up to 50–60° C. All solid went into solution and after approximately ½ hr. a light colored precipitate separated while the reaction mixture was still warm. Stirring and the stream of chlorine gas was continued. The temperature remained between 50–60° C. and in a few minutes most of the precipitate dissolved again. After another few minutes of treatment a precipitate again started to come out and the temperature started to fall. The stream of chlorine gas was stopped and the mixture stirred until the temperature had fallen to that of the room. The yellow crystalline precipitate was filtered off and washed with a small volume of methanol. Yield 3 gms. M. P. soften 160° C., decomp. 167° C. It was crystallized from ethylene dichloride. Yield 2 gms. M. P. soften 160° C., decomp. 170–171° C.

Same conditions and amounts of starting materials used as above. A total of four runs were made. Yields ranged from 5.5 to 6.5 gms. on each run. Decomposition points ranged from 162 to 172° C.

The combined products obtained from above (32 gm.) was crystallized twice from benzene. M. P. 173° C. (decomp.).

The material was crystallized a third time from benzene. It was a light yellow crystalline product. Yield 10 gms. M. P. 172–173° C. (decomp.). Starts to color at 150–155° C.

A sample was dried over $P_2O_5$ in vacuum at 56° C. for 1 hour. Sent for analysis.

Result of analysis

For

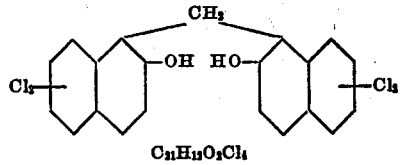

$C_{21}H_{14}O_2Cl_4$

|   | Theory | Found |
|---|---|---|
|   | Per cent | Per cent |
| C | 57.75 | 57.67 |
|   |   | 57.51 |
| H | 2.75 | 2.96 |
|   |   | 2.72 |
| Cl | 32.24 | 32.56 |
|   |   | 32.70 |

The bromo compounds corresponding to the chloro compounds produced in accordance with the above example may be obtained by using bromine instead of chlorine. By varying the time and amount of chlorine or bromine, I can obtain compounds having only one chlorine or bromine radical on each of the naphthyl rings or compounds having three or four chlorines or bromines on each naphthyl ring. Similarly, I may produce mixed chloro and bromo compounds by first producing compounds having one or two chlorines on each naphthyl ring and subsequently brominating to add bromine radicals to the naphthyl rings.

The above description and example are intended to be illustrative only. Any modification or variation therefrom which conforms to the spirit of the invention is intended to be included within the scope of the claims.

What I claim is:
1. The compounds of the formula

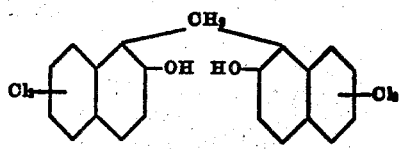

2. The process for producing bis(2-hydroxy-X,X'-dichloronaphthyl-1) methane which comprises reacting bis(2-hydroxy naphthyl-1) methane with chlorine in glacial acetic acid, said reaction being continued until at least two chlorine atoms are added to each of the naphthyl rings.

PHILIP S. WINNEK.

REFERENCES CITED

The following references are of record in the file of this patent:

UNITED STATES PATENTS

| Number | Name | Date |
|---|---|---|
| 1,707,181 | Weiler et al. | Mar. 26, 1929 |
| 1,841,342 | Teppema | Jan. 12, 1932 |
| 2,354,012 | Gump | July 18, 1944 |

OTHER REFERENCES

Shearing, Journal of the Chemical Society, London, 1937. Pages 1931-6.

Smith, Journal of the Chemical Society, London, 35, 789 (1879).